United States Patent Office 3,578,713
Patented May 11, 1971

3,578,713
PROCESS FOR PREPARING TOLUIDINES
John A. Scott, North Haven, Conn., assignor to
Olin Corporation
No Drawing. Filed Nov. 22, 1968, Ser. No. 778,297
Int. Cl. C07c 85/10
U.S. Cl. 260—580                                    7 Claims

ABSTRACT OF THE DISCLOSURE

The process for preparing nitrotoluidines by reacting an aromatic nitro compound with carbon monoxide in the presence of a catalyst comprised of a mixture of an oxide of copper and an oxide of manganese.

This invention relates to the preparation of nitrotoluidines from aromatic nitro compounds.

Toluidines and substituted toluidines are used extensively in the synthesis of dyes and medicines. For example, nitrotoluidines, a term which represents a series of nitro-amino-methylbenzenes, depending upon the relative positions of the three substituents in the benzene ring, are used extensively in the synthesis of dye stuffs because of the various orange, yellow, red-colored crystals formed by the different members of the series.

As indicated in Hackh's Chemical Dictionary, third edition, page 580, the various isomers according to the positions of the three groups in the benzene rings are as follows:

| $NO_2$ | $NH_2$ | $CH_3$ | |
|---|---|---|---|
| | | | Ortho-toluidines |
| 3 | 2 | 1 | Orange prisms, m.92. |
| 4 | 2 | 1 | Yellow monoclinic crystals, m.104. |
| 5 | 2 | 1 | Yellow needles, m.127. |
| 6 | 2 | 1 | Yellow leaflets, m.92. |
| | | | Meta-toluidines |
| 2 | 3 | 1 | Yellow needles, m.53. |
| 4 | 3 | 1 | Yellow leaflets, m.109. |
| 5 | 3 | 1 | Orange needles, m.98. |
| 6 | 3 | 1 | Yellow needles, m.138. |
| | | | Para-toluidines |
| 2 | 4 | 1 | Yellow monoclinic crystals, m.77. |
| 3 | 4 | 1 | Red prisms, m.114. |

Numerous processes have been developed for preparing toluidine from aromatic nitro compounds. U.S. Pat. No. 2,894,988, entitled "Ammonolysis of Meta Nitro Para Cresol," issued July 14, 1959 to John Cryer, describes the preparation of nitrotoluidines by the reaction of nitro-cresol with aqueous ammonia. In other processes, nitrotoluidines are prepared by the catalytic hydrogenation of aromatic nitro compounds in the presence of Raney copper, or by reacting aromatic nitro compounds with hydrogen sulfide in the present of ammonia dissolved in dioxane. In another method 2,4-dinitrotoluene is reacted with hydrogen sulfide in pyridine solution to form nitrotoluidines.

Techniques previously available were not completely satisfactory either because of the expense involved in using high-cost catalyst, the expense involved in separating the large number of reactants and solvents, or because of the low conversions or yields of the desired products.

There is a need at the present time for an improved process for preparing nitrotoluidines.

It is the primary object of this invention to overcome the defects in previously known techniques for preparing nitrotoluidines.

Still another object of this invention is to provide an improved process for preparing nitrotoluidines from aromatic dinitro compounds.

It is a further object of this invention to provide an improved process for preparing nitrotoluidines from dinitrotoluene.

These and other objects of the invention will be apparent from the following detailed description thereof.

It has now been discovered that the foregoing objects are accomplished by reacting an aromatic nitro compound with carbon monoxide in the presence of a catalyst comprised of a mixture of an oxide of copper and an oxide of manganese.

More in detail, any aromatic nitro compound capable of being converted to a nitrotoluidine may be employed as a reactant. As used herein, the term "aromatic nitro compound" represents those organic compounds having at least one nitro group attached directly to an aromatic nucleus such as benzene, naphthalene, and the like, wherein the aromatic nucleus may also contain other substituents as illustrated below.

Among the preferred organic nitro compounds which may be used in the practice of this invention are the nitrobenzenes, both mono- and polynitro, including isomeric mixtures thereof; the alkylnitrobenzenes, including the various nitrated toluenes and the nitrated xylenes; nitrated biphenyl and nitrated diphenylmethanes. Other preferred reactants include bis(nitrophenxoy) alkanes and bis(nitrophenoxy)alkylene ethers. Typical examples of suitable aromatic nitro compounds which can be reacted to form nirotoluidines include the following:

(a) Nitrobenzene
(b) Nitronaphthalenes
(c) Nitroanthracenes
(d) Nitrobiphenyls
(e) Bis(nitrophenyl)methanes
(f) Bis(nitrophenyl)thioethers
(g) Bis(nitrophenyl)ethers
(h) Bis(nitrophenyl)sulfones
(i) Nitrodiphenoxy alkanes
(j) Nitrophenothiazines All of the aforementioned compounds may be substituted with one or more additional substituents such as nitro, alkyl, alkoxy, aryloxy, halogen, alkylthio, arylthio, carboxyalkyl, cyano, isocyanato, and the like, and employed as reactants in the novel process of this invention. Specific examples of suitable substituted-nitro compounds which can be used are as follows:

(1) o-Nitrotoluene
(2) m-Nitrotoluene
(3) p-Nitrotoluene
(4) o-Nitro-p-xylene
(5) 2-methyl-1-nitronaphthalene
(6) m-Dinitrobenzene
(7) p-Dinitrobenzene
(8) 2,4-dinitrotoluene
(9) 2,6-dinitrotoluene
(10) Dinitromesitylene
(11) 4,4'-dinitrobiphenyl
(12) 2,4-dinitrobiphenyl
(13) 4,4'-dinitrobibenzyl
(14) Bis(p-nitrophenyl)methane
(15) Bis(2,4-dinitrophenyl)methane
(16) Bis(p-nitrophenyl)ether
(17) Bis(2,4-dinitrophenyl)ether
(18) Bis(p-nitrophenyl)thioether
(19) Bis(p-nitrophenyl)sulfone
(20) Bis(p-nitrophenoxy)ethane
(21) Bis(p-nitrophenoxy)diethylene ether
(22) 2,4,6-trinitrotoluene
(23) 1,3,5-trinitrobenzene
(24) 1-chloro-2-nitrobenzene
(25) 1-chloro-4-nitrobenzene
(26) 1-chloro-3-nitrobenzene
(26a) Nitrodiphenyl methane
(27) 2-chloro-6-nitrotoluene
(28) 4-chloro-3-nitrotoluene

(29) 1-chloro-2,4-dinitrobenzene
(30) 1,4-dichloro-2-nitrobenzene
(31) alpha-chloro-p-nitrotoluene
(32) 1,3,5-trichloro-2-nitrobenzene
(33) 1,3,5-trichloro-2,4-dinitrobenzene
(34) 1,2-dichloro-4-nitrobenzene
(35) alpha-chloro-m-nitrotoluene
(36) 1,2,4-trichloro-5-nitrobenzene
(37) 1-bromo-4-nitrobenzene
(38) 1-bromo-2-nitrobenzene
(39) 1-bromo-3-nitrobenzene
(40) 1-bromo-2,4-dinitrobenzene
(41) $\alpha,\alpha$-Dibromo-p-nitrotoluene
(42) $\alpha$,-Bromo-p-nitrotoluene
(43) 1-fluoro-4-nitrobenzene
(44) 1-fluoro-2,4-dinitrobenzene
(45) 1-fluoro-2-nitrobenzene
(46) o-Nitrophenyl isocyanate
(47) m-Nitrophenyl isocyanate
(48) p-Nitrophenyl isocyanate
(49) o-Nitroanisole
(50) p-Nitroanisole
(51) p-Nitrophenetole
(52) o-Nitrophenetole
(53) 2,4-dinitrophenetole
(54) 2,4-dinitroanisole
(55) 1-chloro-2,4-dimethoxy-5-nitrobenzene
(56) 1,4-dimethoxy-2-nitrobenzene
(57) m-Nitrobenzaldehyde
(58) p-Nitrobenzaldehyde
(59) p-Nitrobenzoylchloride
(60) m-Nitrobenzoylchloride
(61) 3,5-dinitrobenzoylchloride
(62) Ethyl p-nitrobenzoate
(63) Methyl o-nitrobenzoate
(64) m-Nitrobenzenesulfonylchloride
(65) p-Nitrobenzenesulfonylchloride
(66) o-Nitrobenzenesulfonylchloride
(67) 4-chloro-3-nitrobenzenesulfonylchloride
(68) 2,4-dinitrobenzenesulfonylchloride
(69) 3-nitrophthalic anhydride
(70) p-Nitrobenzonitrile
(71) m-Nitrobenzonitrile
(72) 3,3'-dimethoxy-4,4-dinitro-biphenyl
(73) 3,3'-dimethyl-4,4'-dinitro-biphenyl
(74) 2-isocyanato-4-nitrotoluene
(75) 4-isocyanato-2-nitrotoluene In addition, isomers and mixtures of the aforesaid organic nitro compounds and substituted organic nitro compounds may also be employed, as well as homologues and other related compounds. Generally the aromatic nitro compounds and substituted aromatic nitro compounds contain between about 6 and about 20 carbon atoms.

The catalyst system employed in the process of this invention is a mixture of an oxide of copper and an oxide of manganese. Oxides of copper suitable for use as components of the catalyst system, include cuprous oxide ($Cu_2O$), cupric oxide ($CuO_2$), cupric peroxide

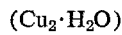

$(Cu_2 \cdot H_2O)$ cupric suboxide ($Cu_4O$) and mixtures thereof.

Suitable oxides of manganese include manganese oxide ($Mn_2O_4$), manganese dioxide ($MnO_2$), manganese heptoxide ($Mn_2O_7$), manganese monoxide ($MnO$), manganese sesquioxide ($Mn_2O_3$), manganese trioxide ($MnO_3$) and mixtures thereof.

Although all of the aforesaid oxides are satisfactory, some are more effective than others. It is preferred to employ a mixture of cupric oxide and manganese dioxide as the catalyst system in the following ratio.

The molar ratio of the oxide of copper to the oxide of manganese is generally in the range of between about 0.05:1 and about 10:1, and is preferably in the range of between about 0.2:1 and about 5:1.

The catalytic proportion of the catalyst system used in carrying out the process of this invention will vary depending upon whether the reaction is carried out on a continuous, semi-continuous or batch basis. For example, when a batch technique is employed, the portion of catalyst system added to the reactor is generally in the range of between about 10 and about 500 percent and preferably between about 100 and about 300 percent by weight of the aromatic nitro compound fed to the reactor. However, when the reaction is carried out on a semi-continuous or continuous basis, the proportion of catalyst in the reactor, at a given instant, may be within the above-identified ranges. In the latter cases, however, the total consumption of the catalyst system during the semi-continuous and continuous processes may be as low as 0.01 percent of the total weight of the aromatic nitro compound passed through the reactor. Any catalytic proportion capable of carrying out the process of this invention may be employed, even if it is greater or lesser than the ranges specified above.

These oxides can be self-supported or deposited on a support for dispersing the catalyst to increase its reactive surface. Aluminia, silica, carbon, barium sulfate, fuller's earth, diatomaceous earth, calcium carbonate, asbestos, bentonite, and analogous materials can be used as a catalyst support.

The reaction between carbon monoxide and aromatic nitro compound may be effected with or without a solvent. Suitable solvents include aliphatic, cycloaliphatic and aromatic solvents such as n-heptane, cyclohexane, benzene, toluene and xylene, and halogenated aliphatic and aromatic hydrocarbons such as dichloromethane, tetrachloroethane, monochloronaphthalene, monochlorobenzene, dichlorobenzene, trichloroethylene, and perchloroethylene, mixtures thereof and the like.

The proportion of solvent is not critical and any proportion may be employed which will not require excessively large equipment to contain. Generally the weight percent of aromatic nitro compound in the solvent is in the range between about 2.0 and about 75 percent, but greater or lesser proportions may be employed, if desired The order of mixing the reactants is not critical and may be varied within the limitations of the equipment employed. In one embodiment, the aromatic nitro compound, catalyst system, and, if desired, solvent is charged to a suitable pressure vessel such as an autoclave which was previously purged with nitrogen, and which preferably provided with agitation means such as a stirrer or an external rocking mechanism. Carbon monoxide is fed into the autoclave until a pressure is attained which is in the range between about 30 and about 10,000 p.s.i.g., and preferably between about 100 and about 8000 p.s.i.g., but greater or lesser pressures may be employed during the reaction if desired.

In another embodiment, one or more of the reactants can be fed continuously into the reactor. For example, the carbon monoxide can be fed continuously, to a batch of aromatic nitro compounds containing the catalyst in the absence or presence of the solvent. Other modifications will be obvious to one skilled in the art, such as feeding all of the reactants, and solvent, f any continuously to the reaction while simultaneously withdrawing off-gases and reaction products.

Generally the quantity of carbon monoxide in the free space of the reactor is sufficient to maintain the desired pressure as well as provide reactant for the process as the reaction progresses. If desired, additional carbon monoxide can be fed to the reactor either intermittently or continuously as the reaction progresses. The total amount of carbon monoxide added during the reaction is generally between about 3 and about 300, and preferably between about 20 and about 200 moles of carbon monoxide per mole of aromatic nitro compound. Greater or lesser amounts may be employed if desired. The highest carbon monoxide requirements are generally utilized in a process in which the carbon monoxide is added continuously, but suitable recycle of the carbon monoxide-containing gas streams greatly reduces the overall consumption of carbon monoxide.

The reaction temperature is maintained above about 25° C., generally between about 100 and about 300° C., and preferably between about 150 and about 275° C. Interior and/or exterior heating and cooling means may be employed to maintain the temperature within the reactor within the desired range.

The reaction time is dependent upon the aromatic nitro compound being reacted, the catalyst, and the amount of catalyst being charged, as well as the type of equipment being employed. Usually between one-half hour and 20 hours are required to obtain the desired degree of reaction, but shorter or longer reaction times may be employed.

The reaction can be carried out batchwise, semi-continuously or continuously.

After the reaction is completed, the temperature of the crude reaction mixture may be dropped to ambient temperature, the pressure vessel is vented, and the reaction products are removed from the reaction vessel. Filtration or other suitable solid-liquid separation techniques may be employed to separate the catalyst from the reaction product, and fractional distillation is preferably employed to isolate the toluidine from the reaction product. However, other suitable separation techniques such as extraction, sublimation, etc., may be employed to separate the nitrotoluidines from the unreacted aromatic nitro compound, and any by-products that may be formed.

The following example is presented to further illustrate the invention without any intention of being limited thereby.

EXAMPLE 1

A 250 milliliter stainless steel stirred autoclave reactor was charged with 126.3 grams of orthodichlorobenzene, 10.0 grams of 2,4-dinitrotoluene, 9.5 grams of cupric oxide and 15.5 grams of manganese dioxide. The reactor was equipped with a gas sparger having an outlet at the bottom of the reactor for feeding carbon monoxide gas below the liquid level. As the reaction progressed carbon monoxide was added to the reactor in order to increase the pressure to about 1000 p.s.i.g., and feeding of the carbon monoxide was conducted at the rate of 1 liter per minute during the entire reaction period. After the operating pressure was obtained, the reaction was heated to 200° C. and was held at that temperature for 200 minutes.

At the end of the reaction period, the reactor was cooled, then vented of gases, and the contents of the reactor were filtered. Analysis of the filtrate by vapor phase chromatography showed the presence of 3-nitro-p-toluidine and 5-nitro-o-toluidine in a 2:1 ratio. The conversion of nitrotoluene was 39 percent, and the total yield of toluidine was 22 percent.

Various modifications of the invention, some of which have been referred to above, can be made without departing from the spirit of the invention.

What is desired to be secured by Letters Patent is:

1. The process for preparing nitrotoluidines which comprises reacting dinitrotoluene with carbon monoxide in the presence of a catalyst system comprised of a mixture of an oxide of copper and an oxide of manganese.

2. The process of claim 1 wherein the proportion of said catalyst system is in the range of between about 10 and about 500 percent by weight of said dinitrotoluene.

3. The process of claim 2 wherein the proportion of carbon monoxide is in the range of between about 3 and about 300 moles of carbon monoxide per mole of dinitrotoluene.

4. The process of claim 3 wherein the weight ratio of said oxide of copper to said oxide of manganese is in the range between about 0.05:1 and about 10:1.

5. The process of claim 4 wherein said oxide of copper is cupric oxide and said oxide of manganese is manganese dioxide.

6. The process of claim 5 wherein the reaction is carried out at a pressure in the range of between about 30 and about 10,000 p.s.i.g. and a temperature in the range of between about 100 and about 300° C.

7. The process of claim 1 wherein the reaction is carried out (a) at a pressure in the range of between about 100 and about 8000 p.s.i.g., (b) at a temperature in the range of between about 150 and 275° C., (c) wherein the proportion of said catalyst system is in the range of between about 100 and about 300 percent by weight of said aromatic nitro compound, (d) wherein the proportion of carbon monoxide is in the range of between about 20 and about 200 moles of carbon monoxide per mole of aromatic nitro compound, and (e) wherein the weight ratio of said oxide of copper to said oxide of manganese is in the range of between about 0.2:1 and about 5:1.

References Cited

UNITED STATES PATENTS 3,293,295   12/1966   Swakon et al. _____ 260—580X

CHARLES B. PARKER, Primary Examiner

R. L. RAYMOND, Assistant Examiner

U.S. Cl. X.R.

260—583, 689